(12) United States Patent
Okahisa et al.

(10) Patent No.: US 9,409,269 B2
(45) Date of Patent: Aug. 9, 2016

(54) POSITIONING APPARATUS, WORKING SYSTEM, AND HOT WORKING APPARATUS

(75) Inventors: Manabu Okahisa, Kitakyushu (JP);
Yusuke Kinoshita, Kitakyushu (JP);
Takashi Suyama, Kitakyushu (JP);
Atsushi Tomizawa, Minou (JP);
Shinjiro Kuwayama, Osaka (JP);
Mitsusato Hara, Kawasaki (JP)

(73) Assignees: KABUSHIKI KAISHA YASKAWA DENKI, Fukuoka (JP); NIPPON STEEL & SUMITOMO METAL CORPORATION, Tokyo (JP); SUMITOMO PIPE & TUBE CO., LTD., Ibaraki (JP)

( * ) Notice: Subject to any disclaimer, the term of this patent is extended or adjusted under 35 U.S.C. 154(b) by 475 days.

(21) Appl. No.: 13/606,686

(22) Filed: Sep. 7, 2012

(65) Prior Publication Data

US 2013/0239639 A1    Sep. 19, 2013

Related U.S. Application Data

(63) Continuation of application No. PCT/JP2011/055590, filed on Mar. 10, 2011.

(30) Foreign Application Priority Data

Mar. 11, 2010  (JP) ................................. 2010-054077

(51) Int. Cl.
*B21B 39/00* (2006.01)
*B23Q 3/02* (2006.01)
*B25J 9/00* (2006.01)

(52) U.S. Cl.
CPC . *B23Q 3/02* (2013.01); *B21B 39/00* (2013.01); *B25J 9/009* (2013.01); *B25J 9/0048* (2013.01); *Y10S 901/03* (2013.01); *Y10S 901/27* (2013.01)

(58) Field of Classification Search
CPC ............. B21D 7/00; B21D 9/00; B25J 17/00; B25J 9/00; B25J 19/00; B25J 13/00; B25J 9/009; B25J 9/0048; B23Q 3/02; B21B 39/00; Y10S 901/27; Y10S 901/03; G05G 9/00
USPC ........... 72/6.1, 6.2, 7.1, 7.2, 7.5, 8.1, 8.4, 8.8, 72/9.3, 9.5, 10.1, 10.5, 10.6, 16.1, 20.1, 72/28.1, 28.2, 29.2, 64, 65, 199, 207, 210, 72/211, 214, 215, 274, 277, 285, 286, 287, 72/291, 342.1, 342.5, 347.6, 200, 201, 72/202, 206, 342.2, 342.6, 364, 369; 700/56, 57, 61, 114, 245–264
See application file for complete search history.

(56) References Cited

U.S. PATENT DOCUMENTS 4,738,015 A * 4/1988 Kato ........................... 29/407.01
5,271,290 A * 12/1993 Fischer .................... 74/471 XY (Continued)

FOREIGN PATENT DOCUMENTS

CN      101132869        2/2008
DE      102005039817 A1 *  3/2007  ........... B62D 57/024

(Continued)

*Primary Examiner* — Shelley Self
*Assistant Examiner* — Peter Iannuzzi
(74) *Attorney, Agent, or Firm* — Clark & Brody

(57) ABSTRACT

A positioning apparatus and a working system which can position a workpiece with better accuracy at a lower cost and in a reduced space even when the workpiece is heavy are provided. The positioning apparatus has 3 robot arms (1)-(3) each having an arm and an actuator which drives the arm, a mounting platform (5) which is supported by the ends of the three robot arms (1)-(3), a securing jig (6) which secures a workpiece W which is mounted on the mounting platform (5) to the mounting platform (5), and a controller (9) which controls the operation of each of the actuators.

5 Claims, 3 Drawing Sheets

(56) References Cited

U.S. PATENT DOCUMENTS

| | | | |
|---|---|---|---|
| 5,706,691 A * | 1/1998 | Okamoto | B21D 5/12 72/20.1 |
| 5,737,500 A * | 4/1998 | Seraji | B25J 9/1643 318/568.11 |
| 5,787,758 A | 8/1998 | Sheldon | |
| 2005/0159075 A1 * | 7/2005 | Isobe | B25J 17/0266 446/104 |
| 2006/0104793 A1 * | 5/2006 | Skutberg | B23Q 1/5462 414/744.6 |
| 2006/0213308 A1 * | 9/2006 | Rosheim | B25J 17/0266 74/490.01 |
| 2006/0245894 A1 * | 11/2006 | Merz | B25J 9/104 414/680 |
| 2008/0066517 A1 * | 3/2008 | Tomizawa | B21D 7/08 72/364 |
| 2009/0065664 A1 | 3/2009 | Kock et al. | |
| 2010/0101359 A1 * | 4/2010 | Breu | B25J 17/0266 74/490.06 |

FOREIGN PATENT DOCUMENTS

| | | | | |
|---|---|---|---|---|
| DE | 102012211190 A1 * | 1/2014 | | B25J 9/009 |
| JP | 10-329078 | 12/1998 | | |
| JP | 10329078 A * | 12/1998 | | |
| JP | 2000-288853 | 10/2000 | | |
| JP | 2005-040919 | 2/2005 | | |
| JP | 2005040919 A * | 2/2005 | | |
| JP | 2007-083304 | 4/2007 | | |
| JP | 2007-160437 | 6/2007 | | |
| JP | 2009-529434 | 8/2009 | | |
| JP | 2012082937 A * | 4/2012 | | |
| WO | WO 2005053913 A1 * | 6/2005 | | B25J 17/0266 |
| WO | WO 2009148603 A1 * | 12/2009 | | B25J 17/0266 |

* cited by examiner

POSITIONING APPARATUS, WORKING SYSTEM, AND HOT WORKING APPARATUS

TECHNICAL FIELD

This invention relates to a positioning apparatus, a working system, and a hot working apparatus which are constituted at a lower cost and have a reduced installation space.

BACKGROUND ART

A positioning apparatus for holding a workpiece which is to undergo working (referred to below simply as a workpiece) and optimizing the position and attitude of the workpiece to a robot for carrying out working is sometimes used when carrying out working operations such as assembly or welding using robots and the like.

Such a positioning apparatus makes it possible to perform working operations on various portions of a workpiece within a smaller workspace using a robot for working operations.

This positioning apparatus is, for example, used in a master/slave robot system in which a workpiece is held at the end of a robot and working is carried out while positioning the workpiece to a working robot.

However, the heavier the workpiece is, the larger output of actuators of the positioning apparatus is required, and hence the dimensions of the positioning apparatus become large.

Therefore, Patent Document 1 discloses a technique for positioning a workpiece in which a plurality of robots are controlled in concert and hold a heavy workpiece. Since the plurality of robots together hold a single workpiece, the power required for each robot decreases. Therefore, the positioning apparatus has a lower cost and takes up less space than when using a single robot having a higher carrying ability.

PRIOR ART DOCUMENTS

Patent Documents

Patent Document 1: JP 2007-160437 A

DISCLOSURE OF INVENTION

Problem which the Invention is to Solve

As disclosed in Patent Document 1, if a workpiece is held by a plurality of robots, an error in the position of the end of each robot with respect to its expected position is produced due to various factors such as differences in the mechanical character of each robot. It is difficult to completely eliminate this error.

When an error in the position of the end of each robot is produced, an unexpected stress can act on the workpiece held by the robots and hence cause defective products.

The object of the present invention is to provide a positioning apparatus and a working system which positions a workpiece with a lower cost and with a smaller space and higher accuracy even when used with a heavy workpiece than prior art and a hot working apparatus using the positioning apparatus.

Means for Solving the Problem

A positioning apparatus according to the present invention is characterized by having three robot arms, each having an arm and an actuator for driving the arm, a mounting platform which is supported by the end portions of each of the three robot arms, a securing jig for securing a workpiece which is disposed on the mounting platform to the mounting platform, and a controller which controls the operation of each actuator.

Each of the three robot arms preferably has a first structural member which is rotatably connected to the base through a first actuator, a second structural member which is gyratory connected to the first structural member through a second actuator, a third structural member which is gyratory connected to the second structural member through a third actuator, and a connecting member which is secured to the mounting platform and is connected to the third structural member through at least one rotational bearing.

Each actuator comprises a servo motor which is driven based on a position instruction from the controller. The controller preferably has the below-described rotation allowing function.

Rotation allowing function: When a load exceeding a previously teaching value is applied to an actuator of at least one of the three robot arms, regardless of a position instruction, it prevents an excessive load on the actuator by allowing rotation of the servo motor.

Of the three robot arms, one of the robot arms is preferably constituted so as to have a mirror image relationship to the other robot arms. Here, a mirror image relationship means that the shape of the first structural member and the second structural member of at least one of the three robot arms is a shape which is reversed to the left and right with respect to the shape of the first structural member and the second structural member of the other two robot arms. Namely, the shape of the first structural member and the second structural member of one of the robot arms and the shape of the first structural member and the second structural member of the other two robots arms have a relationship of a right hand and a left hand. In other words, one of the three robot arms has a shape which is a mirror image of the other two robot arms.

For example, in below-described FIG. 1, in the case of just the lower left third robot arm 3, the second structural member 12 is connected to the right side of the first structural member 11, whereas in the case of the first robot arm 1 and the second robot arm 2, the second structural member 12 is connected to the left side of the first structural member 11. In this manner, of the first robot arm 1 through the third robot arm 3, the shape of the first structural member 11 and the second structural member 12 of the third robot arm 3 is reversed to the left and right with respect to the shape of the first structural member 11 and the second structural member 12 of the first robot arm 1 and the second robot arm 2. As a result, a large range of movement in which the third robot arm 3 does not contact the first robot arm 1 or the second robot arm 2 can be guaranteed, and a large operating range for the mounting platform 5 can be guaranteed.

A working system according to the present invention is characterized by having the above-described positioning apparatus according to the present invention and a working mechanism which carries out working on a workpiece which is positioned by the positioning apparatus.

A hot working apparatus of the present invention is characterized by having a high temperature portion forming mechanism for locally forming a high temperature portion which moves in the axial direction of an elongated material to be worked, a movable roller die which moves while supporting one end of the material with the high temperature portion as a border, and the above-described positioning apparatus according to the present invention which supports the movable roller die so as to be able to move two-dimensionally or three-dimensionally.

Effects of the Invention

According to the present invention, because the weight of a workpiece is stably supported by three robot arms, even when the workpiece being positioned has a large weight, each robot arm can use a smaller actuator, and the apparatus can be made lower in cost and smaller in size. In addition, because the three robot arms position the workpiece through a mounting platform, so even when an error in the positions of the robot arms occurs, stresses due to the positional errors of the robot arms are absorbed by the mounting platform, an excessive stress is prevented from being acted to the workpiece, and the workpiece can be positioned with high accuracy.

Therefore, with a hot working apparatus according to the present invention, positioning can be carried out over a wide operating range while positioning the below-described movable roller die with high positional accuracy by a positioning apparatus which is as simple and inexpensive as possible. Therefore, according to the present invention, it is possible to reliably manufacture a bent member or a sheared member with high dimensional accuracy at a low cost and in a small installation space.

Figure 1:
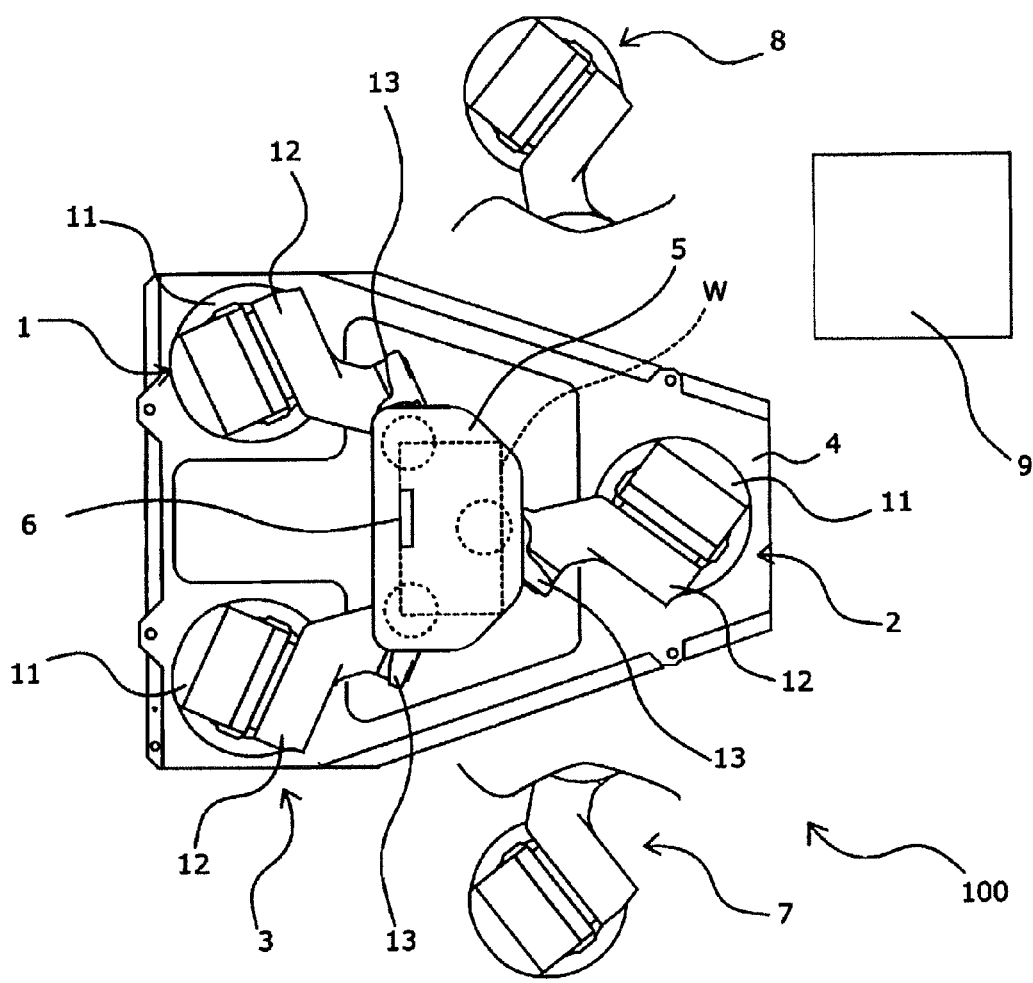
FIG. 1 is a top plan view schematically showing the entire structure of a working system according to an embodiment of the present invention.

EXPLANATION OF SYMBOLS 1 first robot arm
2 second robot arm
3 third robot arm
4 base
5 mounting platform
6 securing jig
7,8 working manipulator (working mechanism)
9 controller
11 first structural member
12 second structural member
13 third structural member
14 fourth structural member
14A first rotational bearing (rotational bearing)
15 fifth structural member
15A second rotational bearing (rotational bearing)
16 connecting member
16A third rotational bearing (rotational bearing)
21-23 actuators
31 servo controller
32 rotation allowing control portion (rotation allowing function)
33 taught operation memory
40 hot working apparatus
41 steel tube
41a high temperature portion
42 support mechanism
43 feed mechanism
44 movable roller die
45 heating mechanism (induction heating coil)
46 water cooling apparatus
47 high temperature portion forming mechanism
48 bent member or sheared member
100 working system

EMBODIMENTS OF THE INVENTION

Embodiment 1

Below, embodiments will be explained while referring to the drawings.

As shown in FIG. 1, a working system 100 of the embodiment has three robot arms comprising a first robot arm 1, a second robot arm 2, and a third robot arm 3, a base 4, a mounting platform 5, a securing jig 6, two working manipulators 7 and 8 (working mechanisms), and a controller 9.

Each of the two working manipulators 7 and 8 functions as a vertical articulated robot. The working manipulators 7 and 8 use end effectors (not shown) provided on their ends to cooperatively carry out working operations (welding, bolt tightening, assembly, or the like) on a workpiece W secured to the mounting platform 5.

The base 4 is formed with a roughly triangular (or trapezoidal) shape as viewed in plan, and it is secured to an installation surface such as a floor. The first robot arm 1, the second robot arm 2, and the third robot arm 3 are each installed in the vicinity of the three vertices of the roughly triangular base 4.

The mounting platform 5 is formed from a metal plate. As described above, the mounting platform 5 is supported from below by connecting members 16, which are the end members of the first through third robot arms 1-3.

The workpiece W is secured to the mounting platform 5 by a securing jig 6 which is provided on the top surface of the mounting platform 5. The securing jig 6 can be any member which can secure the workpiece W to the mounting platform 5 and is not limited to a particular securing jig.

Figure 2:
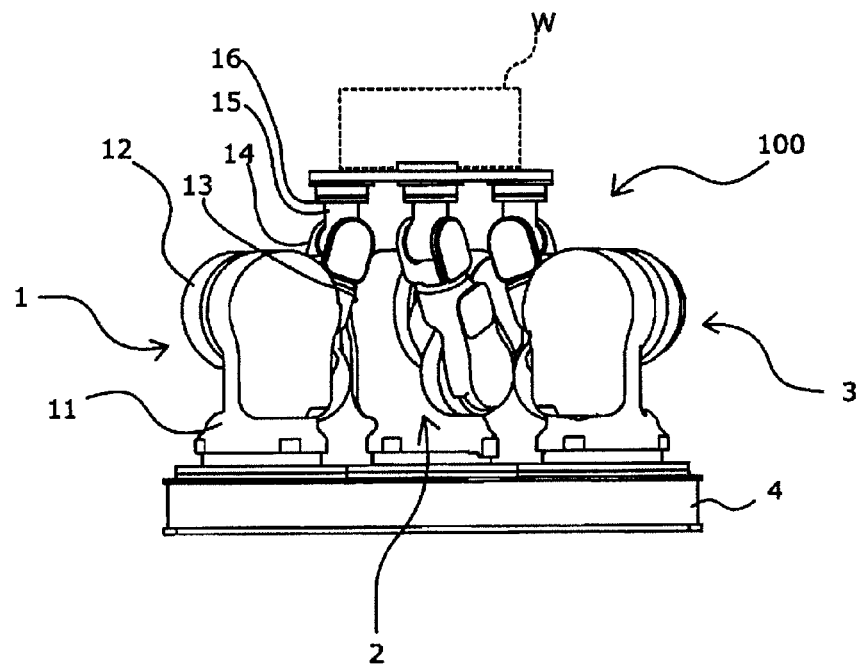
FIG. 2 is a side view schematically showing a positioning apparatus according to an embodiment of the present invention.

As shown in FIG. 2, the first robot arm 1, the second robot arm 2, and the third robot arm 3 each have a first structural member (arm) 11, a second structural member (arm) 12, a third structural member (arm) 13, a fourth structural member 14, a fifth structural member 15, a connecting member 16, a first rotational bearing 14A, a second rotational bearing 15A, and a third rotational bearing 16A.

Figure 3:
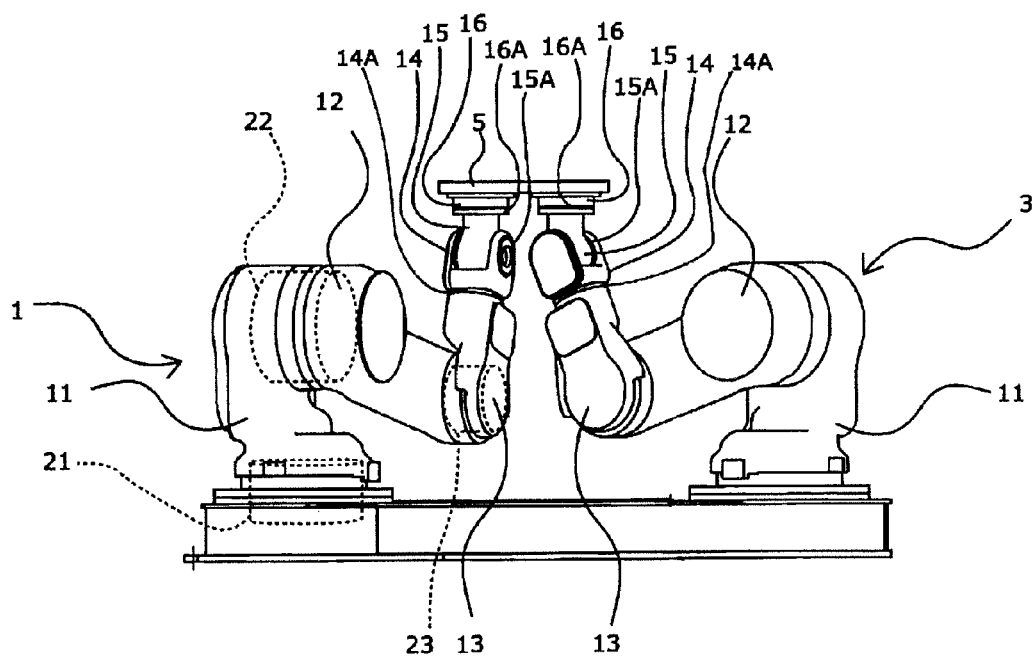
FIG. 3 is a side view schematically showing a positioning apparatus according to an embodiment of the present invention with a portion omitted and with a portion shown in perspective.

As shown in FIG. 3, the first robot arm 1, the second robot arm 2, and the third robot arm 3 each have three actuators 21-23 inside them. The actuators 21-23 are each constituted by an integral servo motor a reduction gear and a hollow portion at its center through which a cable can pass. Each of actuators 21-23 is connected to the controller 9 by a corresponding cable (not shown).

It is not always necessary to comprise the fourth structural member 14 and the fifth structural member 15, and the third structural member 13 may be directly connected to the connecting member 16.

In FIG. 3, the actuators 21-23 are shown only for the first robot arm 1, and the actuators 21-23 for the second robot arm 2 and the third robot arm 3 are not shown. However, both the second robot arm 2 and the third robot arm 3 have actuators 21-23 inside them in the same manner as the first robot arm 1.

The first robot arm 1, the second robot arm 2, and the third robot arm 3 have the same structure as each other except that, as described below, the third robot arm 3 is constituted so as to have a mirror image relationship to the first robot arm 1 and the second robot arm 2. The structure of only the first robot arm 1 will be explained in detail as follows. The end of each robot arm 1-3 closest to the base 4 will be referred to as the base end, and the end of each robot arm 1-3 closest to the mounting platform 5 will be referred to as the distal end.

The first structural member 11 is mounted through actuator 21 so as to extend upwards from the top surface of the base 4. The axis in the lengthwise direction of the first structural member 11 rotates with respect to the base 4 when the actuator 21 is driven (it is a so-called rotational axis). The distal end of the first structural member 11 is connected to the second structural member 12 through actuator 22. Actuator 22 is a so-called gyrating axis. The second structural member 12 gyrates with respect to the first structural member 11 when actuator 22 is driven.

The distal end of the second structural member 12 is connected to the third structural member 13 through actuator 23, which is also a gyrating axis. The third structural member 13 pivots with respect to the second structural member 12 when actuator 23 is driven.

The distal end of the third structural member is connected to the fourth structural member 14 through the first rotational bearing 14A. The first rotational bearing 14A allows rotation in the so-called rotational axis direction. Due to rotation of the first rotational bearing 14A, the fourth structural member 14 rotates with respect to the third structural member 13 about an axis which extends roughly in the lengthwise direction of the third structural member 13.

The distal end of the fourth structural member 14 is divided into two parts, and the fifth structural member 15 is rotatably supported at the ends of the two parts by the second rotational bearing 15A. The fifth structural member 15 is connected to the connecting member 16 through the third rotational bearing 16A. The rotational axis of the second rotational bearing 15A and the rotational axis of the third rotational bearing 16A are perpendicular to each other. The second rotational bearing 15A acts as a gyrating axis which permits rotation, and the third rotational bearing 16A acts as a rotational axis which permits rotation. The connecting member 16 is secured by bolts or the like to the bottom surface of the mounting platform 5.

As shown in FIGS. 1-3, the shape of the first structural member 11 and the second structural member 12 of the third robot arm 3 is bilaterally symmetrical with respect to the shape of the first structural member 11 and the second structural member 12 of the first robot arm 1 and the second robot arm 2. If the first robot arm 1 and the second robot arm 2 are considered left handed, the third robot arm has a mirror image relationship so it is right handed.

The controller 9 is constituted by a computer having a memory, a processor, and an input apparatus (all of which are not shown). The controller 9 is connected through cables to the actuators provided in the first through third robot arms 1-3 and the two working manipulators 7 and 8. The controller 9 can conduct data communication with each actuator.

Figure 4:
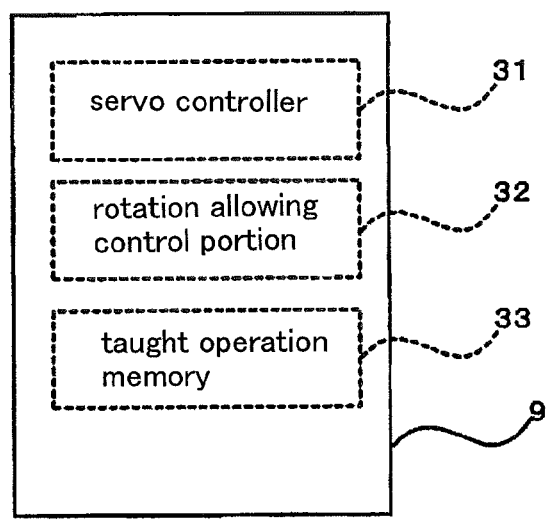
FIG. 4 is a block diagram for explaining the functional makeup of a controller according to an embodiment of the present invention.

As shown in FIG. 4, the controller 9 is functionally constituted by a servo control portion 31, a rotation allowing control portion (rotation allowing function) 32, and a taught operation memory 33.

To the taught operation memory 33, teaching data (the collected position data indicating the path of operation of the first through third robot arms 1-3 and the two working manipulators 7 and 8) is previously input by an unillustrated input apparatus.

Based on the teaching data stored in the taught operation memory 33 and position signals and current signals input from the servo motors of the actuators, the servo controller 31 carries out feedback control including a position feedback loop, a speed feedback loop, and a current feedback loop (torque loop) and sends a position instruction to the servo motor of each actuator every calculation cycle.

The rotation allowing control portion 32 has a rotation allowing function which selects one of the first through third robot arms 1-3 based on attitude information on the first through third robot arms 1-3 (position information on the corresponding actuators). When a current signal which is input from the servo motors for each actuator of the selected first through third robot arms 1-3 (the torque information, namely, the applied load) is larger than a previously set value, regardless of the value output from the servo controller 31, the instructed current value sent to the servo motor of each actuator is limited, and the actuators of the selected one of the first through third robot arms 1-3 is prevented from overloading by allowing rotation of the servo motors.

The working system 100 which is constituted as described above allows that, even when the workpiece 3 which is being positioned is heavy, it is supported by the first through third robot arms 1-3 that adequate positioning of the workpiece W is possible even if the actuators of each robot arm are small and have a low output.

As a result, the first through third robot arms 1-3 can be reduced in size at a lower cost. In addition, the first through third robot arms 1-3 do not directly hold the workpiece W but position the workpiece W through the mounting platform 5 and the securing jig 6. Therefore, even when an error (or tolerance) in the position or the like of the connecting members 16 of the robot arms 1-3 develops, as far as it is a small error, an error in the position in any direction can be absorbed to a certain extent by deformation of the mounting platform 5 itself or by allowing rotation with 3 degrees of freedom of the distal ends of the first rotational bearing 14A, the second rotational bearing 15A, and third rotational bearing 16A of the robot arms 1-3. Therefore, the action of stress to the workpiece W caused by positional error can be greatly reduced.

If the error in the position of the connecting members 16 of the robot arms 1-3 is even relatively large, when a load of at least a previously teaching level is applied to the actuator of the one of the robot arms 1-3 which is selected in accordance with the positions of the robot arms 1-3, regardless of the position instructions, the rotation allowing control portion 32 allows rotation of the servo motors. As a result, an excessive load is prevented from being applied to the mounting platform 5 or the robot arms 1-3, excessive deformation of the mounting platform 5 or the action of a stress thereby to the workpiece W can be prevented, and hence the workpiece W can be positioned with greater accuracy. In addition, an excessive load can be prevented from being applied to the robot arms 1-3, whereby an unexpected load on the robot arms 1-3 can be prevented from being applied.

Because the mounting platform 5 and the workpiece W are supported by three robot arms 1-3, even when the operation of one of the robot arms is limited by the rotation allowing control portion 32, the workpiece W can be adequately supported by the remaining two robot arms.

Each of the first through third robot arms 1-3 has three degrees of freedom. Therefore, compared to a direct drive parallel link mechanism, for example, the range of movement of the mounting platform 5 can be maintained at a large value.

The first structural member 11 of each robot arm 1-3 is installed in the vicinity of the three vertices of the triangular base 4, and robot arms 1 and 2 have a mirror image relationship with respect to robot arm 3. Therefore, when the robot arms 1-3 are folded and mounting platform 5 is lowered to the vicinity of base 4, the first structural members 11 and the second structural members 12 are positioned along the triangular sides of the base 4. As a result, interference between the three robot arms 1-3 can be avoided, and the footprint of the robot arms 1-3 to the outer side can be reduced.

An embodiment of the present invention has been explained above, but a positioning apparatus according to the present invention is not limited to the embodiment, and suitable variations can be employed without deviating from the essence of the present invention.

For example, in the above-described embodiment, as explained above, the first through third robot arms and working manipulators are controlled by a single controller. However, the controller may be constituted by using separate members. In addition, a single robot arm may be controlled by a plurality of controllers. For example, a separate controller may perform only servo control.

Embodiment 2

Figure 5:
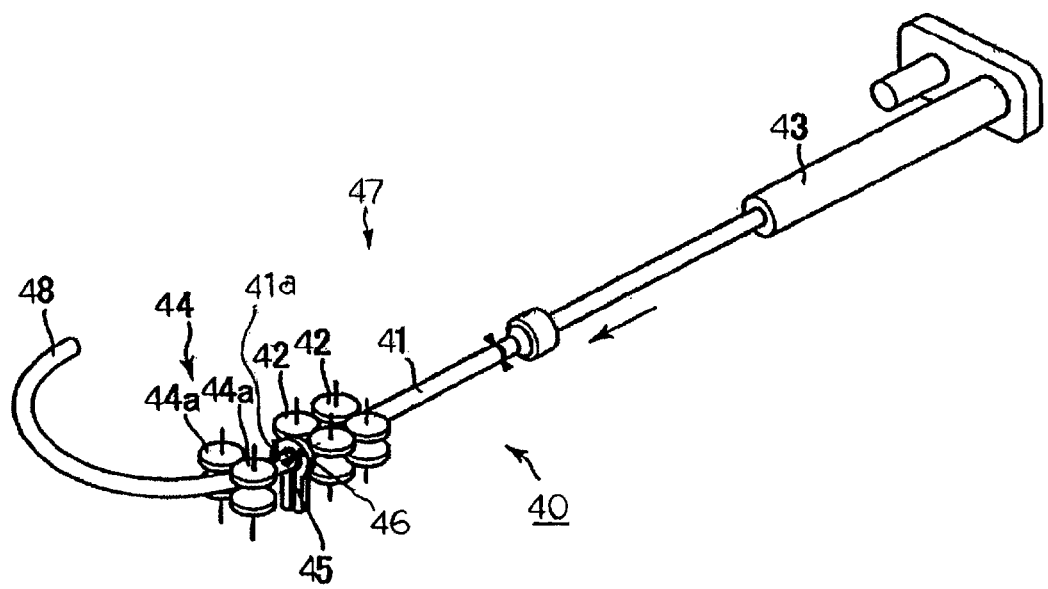
FIG. 5 is an explanatory view showing in simplified form a hot working apparatus disclosed in WO 2006/093006.

FIG. 5 is an explanatory view showing in simplified form a hot working apparatus 40 disclosed in WO 2006/093006.

In Embodiment 2, a movable roller die 44 of the hot working apparatus 40 is supported by the positioning apparatus of Embodiment 1, wherein its installation position is movable. At first, the hot working apparatus 40 will be briefly explained.

The hot working apparatus 40 feeds a steel tube 41, which is supported by a support mechanism 42 so as to be able to move in its axial direction, from its upstream side towards its downstream side by a feed mechanism 43 such as employing a ball screw. The steel tube 41 is locally rapidly heated to a temperature range in which hardening is possible (at least the $Ac_3$ point) by a heating mechanism (an induction heating coil) 45 downstream of the support mechanism 42, and cooling water is sprayed at the steel tube 41 from a water cooling apparatus 46 disposed downstream of the heating mechanism 45 to rapidly cool the steel tube 41, whereby a high temperature portion 41a at a temperature of at least the $Ac_3$ point is formed between the location where the steel tube 41 is heated by the induction heating coil 45 and the location where cooling water is sprayed at the steel tube 41. By two-dimensionally or three-dimensionally varying the position of a movable roller die 44 having at least one set of roll pairs 44a which can support the steel tube 41 while feeding it, a bending moment or a shearing moment is applied to the high temperature portion 41a of the steel tube 41. In this manner, the hot working apparatus 40 manufactures a bent member or a sheared member 48.

Namely, the hot working apparatus 40 comprises the support mechanism 42, the feed mechanism 43, the high temperature portion forming mechanism 47 comprising the heating mechanism 45 and the cooling mechanism 46, the movable roller die 44 which moves while supporting one end of the steel tube 41 with the high temperature portion 41 as a border, and the positioning apparatus of Embodiment 1 which supports the movable roller die 44 so as to move two-dimensionally or three-dimensionally, whereby a high temperature portion 41a which moves in the axial direction of an elongated material in the form of the steel tube 41 is partially formed. For example, a casing (not shown) of the movable roller die 44 can be mounted on the top surface of the mounting platform 5 of the positioning apparatus of Embodiment 1, and it can be installed in a prescribed fixed position by a suitable securing jig 6.

As a feed mechanism 43 which is disposed at the other end of the steel tube 41 with the high temperature portion 41a as a border, a conventional feed apparatus using a ball screw, for example, and an industrial robot are used. The movable roller die 44 which is supported by the device explained at Embodiment 1 so as to move two-dimensionally or three-dimensionally can apply a bending moment or a shearing moment to the high temperature portion 41a of the steel tube 41 in accordance with the manner of movement of the movable roller die 44, whereby the steel tube 41 can be bent or sheared.

Due to the hot working apparatus 40 being constituted as discussed above, even when the steel tube 41 is heavy, since the weight is shared among the first through third robot arms 1-3, it is possible to adequately position the steel tube 41 even if the actuators of the robot arm are small and have a low output.

As a result, the first through third robot arms 1-3 can be downsized at a lower cost. Because the movable roller die 44 is not held by the first through third robot arms 1-3 but is positioned by the mounting platform 5 and the securing jig 6, even when errors (or tolerance) develop in the installation positions of the connecting members 16 of the robot arms 1-3, as far as the error is of a small scale, positional error in any direction can be absorbed to a certain extent by deformation of the mounting platform 5 itself or by allowing rotation with 3 degrees of freedom of the distal ends of the robot arms 1-3 by the first rotational bearing 14A, the second rotational bearing 15A, and the third rotational bearing 16A, and the action of stresses to the movable roller die 44 due to positional errors can be greatly reduced.

If the positional error of the connecting members 16 of the robot arms 1-3 is relatively large, the rotation allowing control portion 32 allows appropriate rotation of the servo motors neglecting the position instructions when a load exceeding a previously teaching load is applied to each actuator of a robot arm which is selected from robot arms 1-3 in accordance with the attitude of each robot arm. Therefore, an excessive load is prevented from being applied to the mounting platform 5 and the robot arms 1-3, and excessive deformation of the mounting platform 5 or the action of a stress load or the like to the movable roller die 44 due to such deformation can be suppressed, making it possible to position the movable roller die 44 more precisely. In addition, the application of an excessive load to the robot arms 1-3 can be prevented, so the application of unexpected loads to the robot arms 1-3 can be avoided.

As the mounting platform 5 and the movable roller die 44 are supported by three robot arms 1-3, even when the movement of one of the robot arms is limited by the rotation allowing control portion 32, the movable roller die 44 can be adequately supported by the remaining two robot arms.

Each of the first through third robot arms 1-3 has three degrees of freedom. Therefore, a greater range of movement of the mounting platform 5 can be guaranteed compared to a direct-drive parallel link mechanism or the like.

The first structural member 11 of each robot arm 1-3 is installed in the vicinity of the three vertices of the triangular base 4, and robot arms 1 and 2 have a mirror image relationship to robot arm 3. Therefore, when the robot arms 1-3 are folded and the mounting platform 5 is lowered to the vicinity of the base 4, the first structural members 11 and the second structural members 12 are positioned along the triangular sides of the base 4. As a result, interference among the robot arms 1-3 can be avoided, and the footprint over the outer sides of the robot arms 1-3 can be reduced.

In this manner, the movable roller die 44 of the hot working apparatus 40 can be positioned with high accuracy and can be positioned over a wide range of operation by a simple and inexpensive positioning apparatus. Therefore, a bent member or a sheared member 48 can be reliably and inexpensively manufactured with a high dimensional accuracy in a small installation space.

In order to prevent deformation of the steel tube 41 after hot working and a decrease in the dimensional accuracy of a bent member or a sheared member 48 due to the application of a bending moment to the high temperature portion 41*a* of the steel tube 41 caused by an increase in the weight of the portion of the steel tube 41 which extends from the movable roller die 44 (referred to below as the end portion) as working progresses, it is preferable to support the end portion by a suitable means (referred to below as a deformation suppressing member) to prevent a bending moment from acting on the high temperature portion 41*a*. Such a deformation suppressing member is not limited to a prescribed member, and it can be any member which can suppress deformation of the steel tube 41. For example, a suitable support base or support member may be used, but it is particularly preferable to use a general purpose articulated industrial robot which is installed so as to be able to move within a prescribed space and which supports the end portion of the steel tube 41.

The invention claimed is:

1. A positioning apparatus comprising:
   three robot arms each having an arm and an actuator which drives the arm,
   a mounting platform which is secured to ends of the three robot arms,
   a securing jig which secures a workpiece to the mounting platform, and
   a controller which controls the operation of the actuators; and
   the three robot arms each comprise:
   a first structural member which is rotatably connected to a base through a first actuator,
   a second structural member which is gyratory connected to the first structural member through a second actuator,
   a third structural member which is gyratory connected to the second structural member through a third actuator, and
   a connecting member which is secured to the mounting platform and is connected to the third structural member through at least one rotatable bearing;
   wherein a shape of the first and second structural members of one of the three robot arms is constituted so as to have a mirror shape relationship being reversed to a left and right with respect to a shape of the first and second structural member of each of the other two robot arms, and
   wherein the other two robot arms have a non-mirror shape relationship with each other; and
   further wherein during movement of the three robot arms with the mounting platform being secured to the ends of the three robot arms, the mirror shape relationships and non-mirror shape relationship are maintained.

2. A positioning apparatus according to claim 1, wherein each actuator has a servo motor which is driven based on a position instruction from the controller, and
   the controller has a rotation allowing function which when a load exceeding a previously determined level is applied to the actuator of at least one of the three robot arms, regardless of the position instruction, allows rotation of the servo motor to prevent the application of an excessive load to the actuator.

3. A working system comprises:
   a positioning apparatus according to claim 1, and
   a working mechanism for performing a working operation on a workpiece which is positioned by the positioning apparatus.

4. A hot working apparatus comprises a high temperature portion forming mechanism for partially forming a high temperature portion which moves in the axial direction of an elongated material being worked, a movable roller die which moves while supporting one end of the material being worked with the high temperature portion as a border, and a positioning apparatus according to claim 1 which supports the movable roller die so as to be able to move two-dimensionally or three-dimensionally.

5. The hot working apparatus according to claim 4, wherein the robot arms, which are disposed downstream in a feed direction of the material, have the mirror shape relationship so that the first and second structural members of the robot arms are separated from each other.

* * * * *